United States Patent [19]

Rikuna

[11] Patent Number: 4,827,113
[45] Date of Patent: May 2, 1989

[54] TECHNIQUE FOR AUTHENTICATING IC CARD AND TERMINAL

[75] Inventor: Kenji Rikuna, Tokyo, Japan

[73] Assignee: Casio Computer Co., Ltd., Tokyo, Japan

[21] Appl. No.: 786,297

[22] Filed: Oct. 10, 1985

[30] Foreign Application Priority Data

Oct. 19, 1984 [JP] Japan .................................. 59-219980

[51] Int. Cl.⁴ .......................... G06F 15/20; G06K 7/04
[52] U.S. Cl. .................................... 235/432; 235/379; 235/380; 235/441; 380/24
[58] Field of Search ................ 101/DIG. 18; 235/375, 235/492, 432, 441, 379, 380, 487, 488; 340/825.33, 825.34; 364/401, 406, 408; 380/4, 24, 30, 45, 47; 902/26, 22, 2, 1

[56] References Cited

U.S. PATENT DOCUMENTS

| | | | |
|---|---|---|---|
| 3,818,187 | 6/1974 | Lovendusky et al. | 235/380 |
| 4,262,589 | 4/1981 | Gebhardt | 235/379 |
| 4,268,715 | 5/1981 | Atalla | 340/825.34 |
| 4,423,287 | 12/1983 | Zeidler | 340/825.34 |
| 4,436,182 | 3/1984 | Simonotti et al. | 235/379 |
| 4,498,000 | 2/1985 | Decavele et al. | 235/380 |
| 4,536,647 | 8/1985 | Attalla et al. | 235/379 |
| 4,630,201 | 12/1986 | White | 235/380 |
| 4,650,975 | 3/1987 | Kitchener | 235/380 |
| 4,678,895 | 7/1987 | Tateisi et al. | 235/379 |
| 4,678,896 | 7/1987 | Carlson et al. | 235/380 |

FOREIGN PATENT DOCUMENTS

2133744 8/1984 United Kingdom .
8200213 1/1982 World Int. Prop. O. .

OTHER PUBLICATIONS

*International Conference on Secure Communication Systems:* Feb. 1984, pp. 1-4, IEEE, London GB; D. W. Davies: "Smart Cards, Digital Signatures and Negotiable Documents", p. 2, Paragraph Digital Signature.

*Primary Examiner*—Alan Faber
*Assistant Examiner*—Robert A. Weinhardt
*Attorney, Agent, or Firm*—Frishauf, Holtz, Goodman & Woodward

[57] ABSTRACT

An IC card is placed on a card terminal main body, and an internal IC of the IC card is electrically connected to an electrical circuit in a terminal through a connector. Input data entered by a card holder at a keyboard and data read out from the IC card are encrypted in accordance with a predetermined encryption algorithm and are compared with each other. Authenticity of the card terminal and the IC card is determined in accordance with the comparison result.

15 Claims, 10 Drawing Sheets

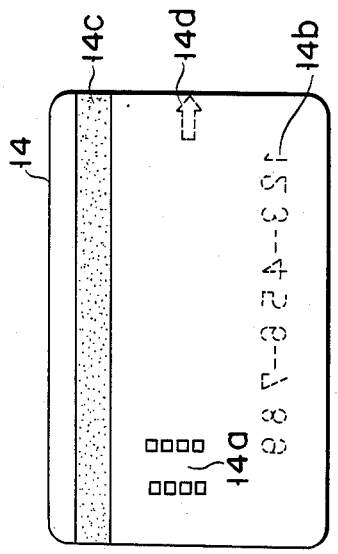
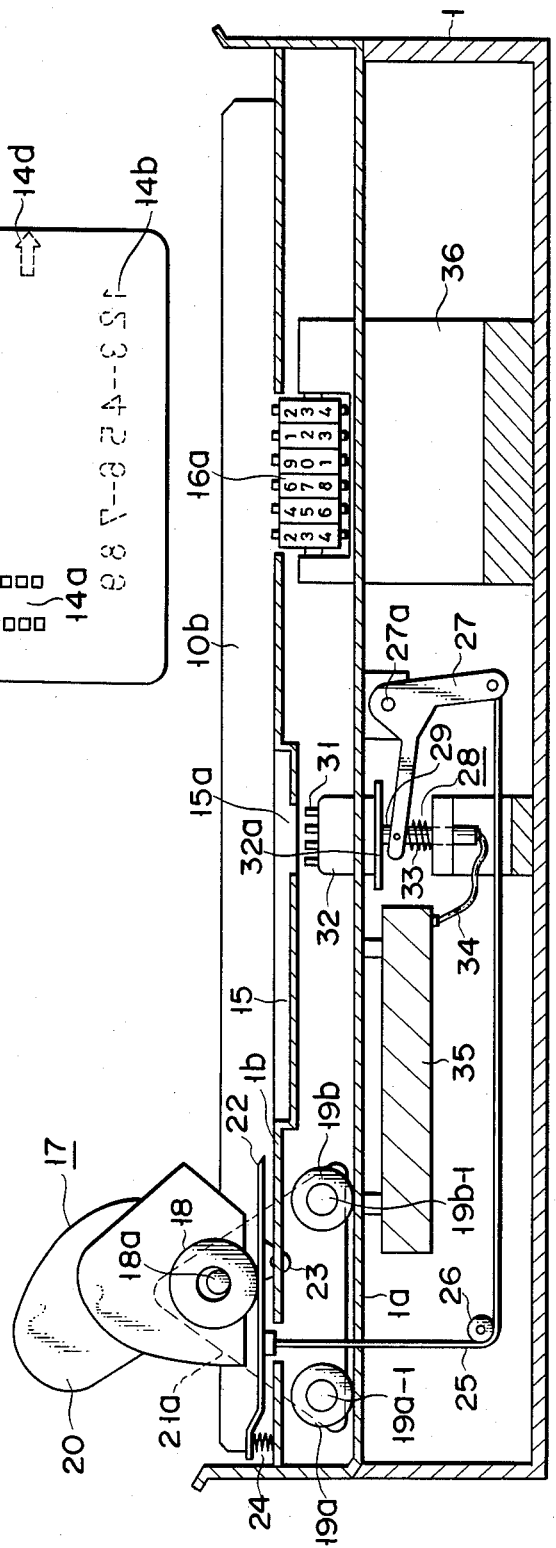
FIG. 2
FIG. 3A

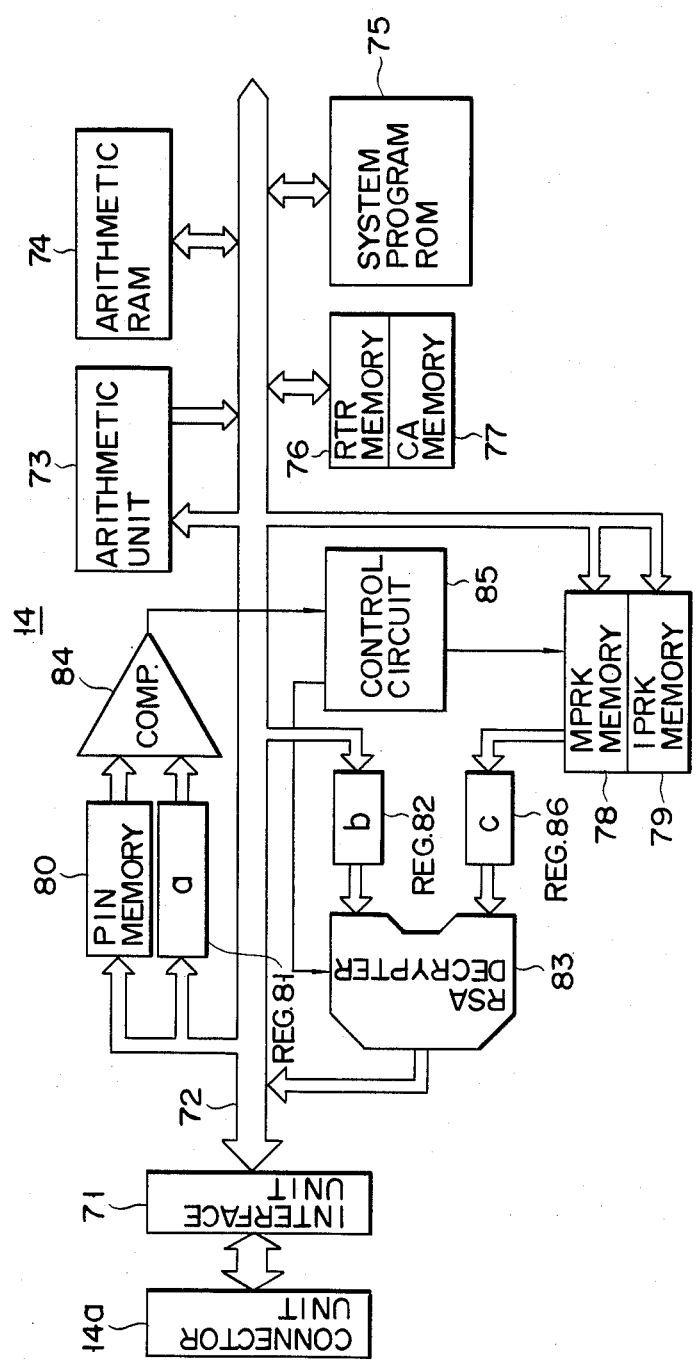
F I G. 5

TECHNIQUE FOR AUTHENTICATING IC CARD AND TERMINAL

BACKGROUND OF THE INVENTION

The present invention relates to a card terminal and a card terminal identification system which authenticates an identification card (ID card) and a card terminal.

Various systems have been developed to properly identify authenticity of an IC card, i.e., an ID card incorporating an IC chip instead of an ID card having a magnetic stripe. Card authentication terminals as point-of-sales (POS) terminals installed in stores to deal with ID cards must also be authenticated. This authentication process is inevitable in order to guarantee safe transactions. Demand has arisen for development of a system for authenticating an ID card presented by a customer and a card terminal installed in a store when a customer purchases an item in a store by using an ID card.

SUMMARY OF THE INVENTION

It is an object of the present invention to provide a card terminal and a card terminal identification system for properly authenticating an ID card having a magnetic stripe and/or an IC chip and a card terminal, thereby confirming that a proper transaction is made.

In order to achieve the above object of the present invention, there is provided an ID card terminal comprising: emboss imprint means for transferring an embossed pattern onto a sheet of paper for representing the contents of a transaction by using the embossed pattern formed on a surface of the ID card; read/write means for performing read/write operation of data with respect to a memory in the ID card; means for processing the data; and casing means for housing the emboss imprint means, the read/write means and the data processing means therein.

BRIEF DESCRIPTION OF THE DRAWINGS

FIG. 2 is a plan view of an IC card suitable for the card terminal of FIG. 1;

FIGS. 3A and 3B are respectively side sectional views showing the internal structure of the card terminal of FIG. 1;

FIG. 5 is a block diagram showing a circuit arrangement of the IC card of FIG. 2;

DETAILED DESCRIPTION OF THE PREFERRED EMBODIMENT

A preferred embodiment of the present invention will be described with reference to the accompanying drawings.

Figure 1:
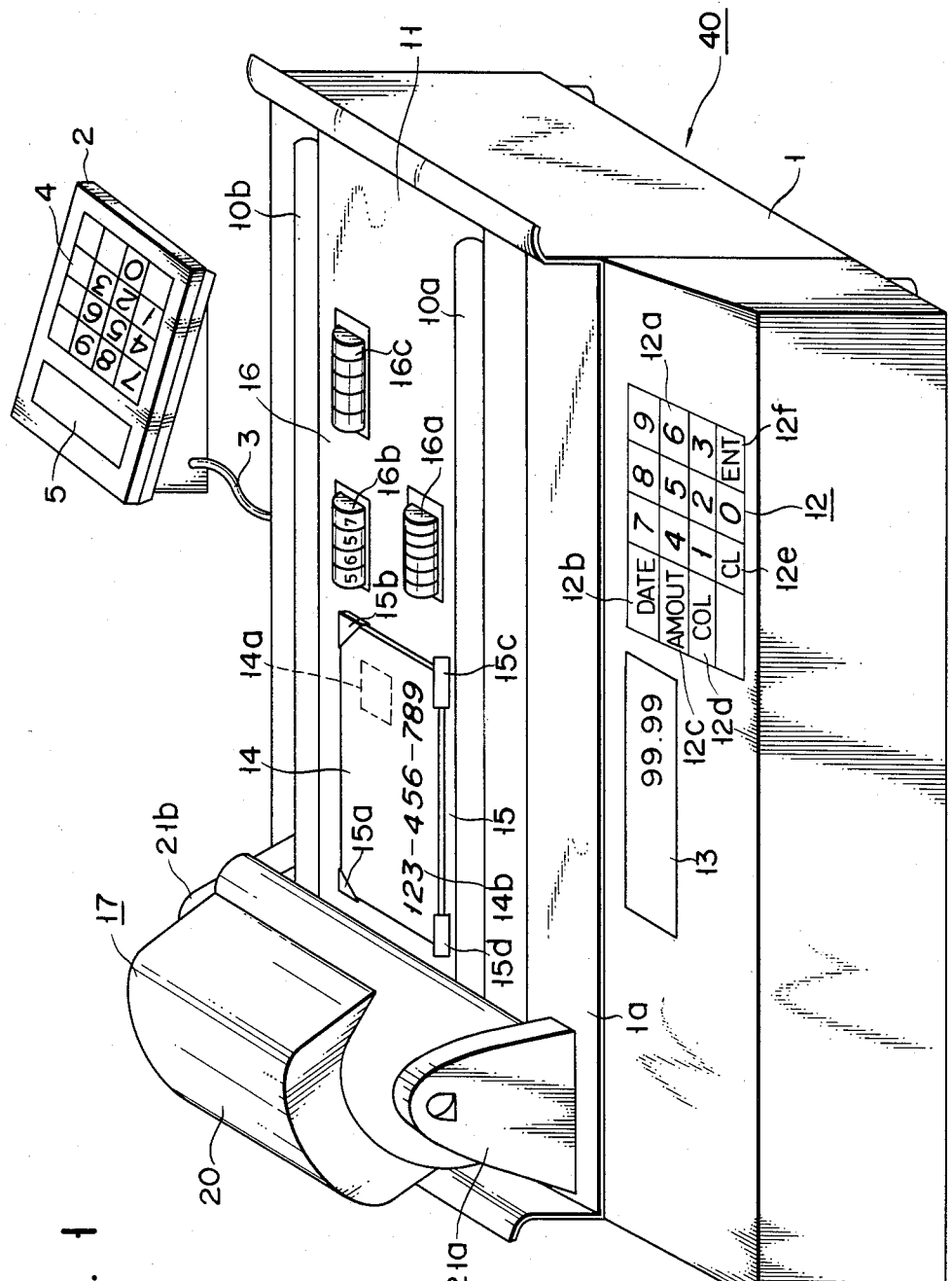
FIG. 1 is a perspective view of a card terminal according to an embodiment of the present invention.

Referring to FIG. 1, a card terminal main body 1 and an input unit 2 are connected through a cord 3, all constituting a card terminal 40. The unit 2 is independent of the body 1 so that a customer can enter secret key code data without being observed by a store clerk. The unit 2 has a data input keyboard 4 and a display unit 5 for displaying various data. The keyboard 4 includes a ten-key pad for entering numeric data.

The body 1 is operated by the store clerk and has an emboss imprint unit 11 at the upper portion of the body housing, and a keyboard 12 and a message/amount display unit 13, the latter two being arranged on the front surface of the housing. The keyboard 12 includes a ten-key pad 12a, a date key 12b, a total amount key 12c, a collation key 12d, a clear key 12e and an input designation key 12f.

The unit 11 includes a card holder 15 on which an IC card 14 is placed, a printing portion 16 and a carriage 17. These portions are arranged on an upper plate 1a. The holder 15 has four positioning members 15a to 15d, so that the card is fixed in proper position.

An embossed portion 14b of the card 14 on the upper surface thereof represents a specific card holder's code number (123-456-789 in this embodiment) when the card 14 is set in the holder 15. A connector 14a is arranged on an opposite surface of the card 14 which faces the body 1. The connector 14a is connected to an IC chip arranged in the card 14 and comprises eight contacts consisting of two arrays of four contacts, as shown in FIG. 2. A magnetic stripe 14c is formed on the surface with the connector 14a along the longitudinal edge of the card 14. An arrow 14d represents a setting direction of the card 14 in the holder 15.

Referring back to FIG. 1, the printing portion 16 comprises a 6-digit amount printing ring unit 16a, a sales approval number (SAN) printing ring unit 16b and a date printing ring unit 16c. These units 16a to 16c are at the same level as the embossed portion 14b on the card 14. Two guides 10a and 10b are arranged along the holder 15 and the portion 16, and the carriage 17 is freely moved along the guide members 10a and 10b.

Figure 3B:
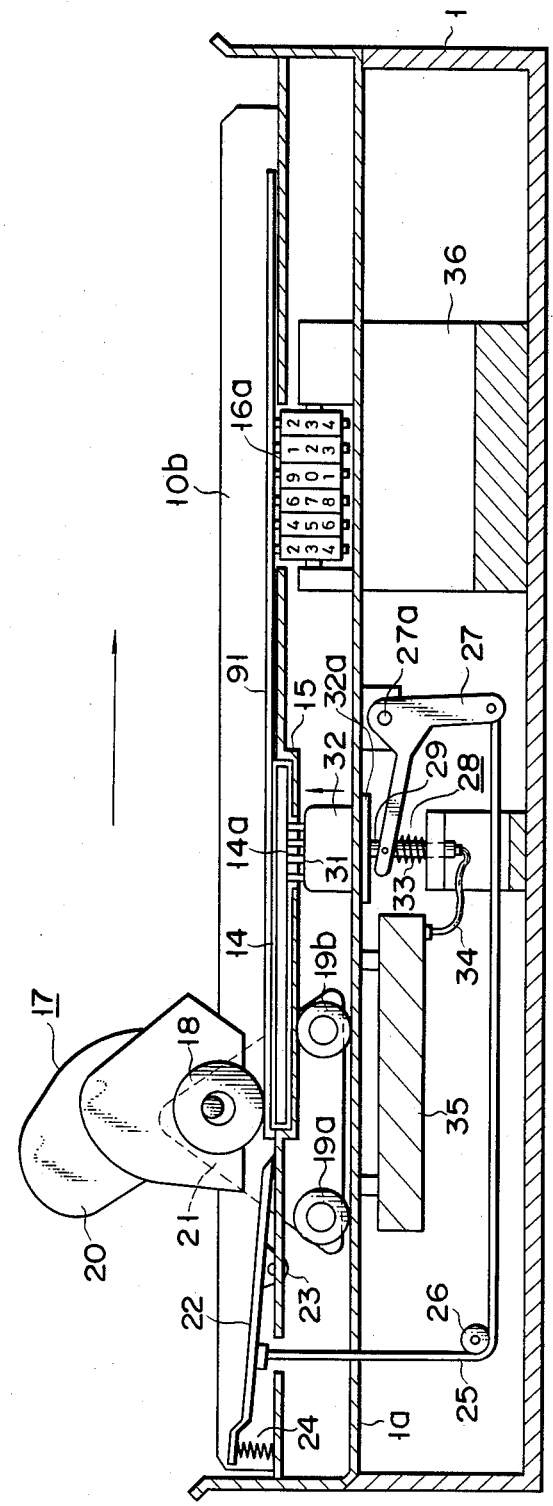

The structure and operation of the emboss imprint unit 11 including the carriage 17 will be described with reference to FIGS. 3A and 3B. Referring to FIG. 3A, the carriage 17 comprises a press roller 18, guide rollers 19a and 19b and a handle 20. The rollers 19a and 19b are narrow rollers rolling along the member 10a. Other guide rollers (not shown) which roll along the guide member 10b are also provided. The press roller 18 has a sufficient width to allow rolling on the portion 14b and the units 16a to 16c. Two ends of each of shafts 18a, 19a-1 and 19b-1 of the rollers 18, 19a and 19b are rotatably held between holding plates 21a and 21b as shown in FIG. 1, respectively. The plates 21a and 21b are also mounted on the carriage 17, and the lower ends of the plates 21a and 21b are moved along the surface of the plate 1a upon movement of the carriage 17. The shafts 18a, 19a-1 and 19b-1 of the rollers 18, 19a and 19b are supported at vertices of each of the triangular holding plates 21a and 21b.

As shown in FIG. 3A, the left end of the unit 11 serves as the normal rest position of the carriage 17.

When the carriage 17 is held in this state, the store clerk can place the card 14 in the holder 15 or remove it therefrom. The carriage 17 can be manually moved to the right end of the unit 11 along the guide members 10a and 10b while the store clerk holds the handle 20 and moves his hand to the right end. For illustrative convenience, only the unit 16a is illustrated in FIGS. 3A and 3B.

In the rest position (FIG. 3A) of the carriage 17, a lever 22 is arranged at a position under the roller 18. The lever 22 is pivotally supported by a shaft 23 on a plate 1b at a position nearer to the holder 15 than the roller 18, a predetermined distance from a position immediately under the roller 18 located in the rest position. A coil spring 24 is inserted between one end of the lever 22 and the plate 1b so as to always bias the lever 22 clockwise. One end of a transmission wire 25 is fixed on the lower surface of the lever 22 between the shaft 23 and the spring 24. The other end of the cord 25 is inserted in the body 1 through a roller 26 and is fixed to one end of an L-shaped lever 27.

An intermediate portion of the lever 27 is pivotally supported by a shaft 27a at the lower surface side of the plate 1a. The other end of the lever 27 is pivotally supported at the intermediate portion of an actuating shaft 29 of a terminal mechanism 28. The mechanism 28 extends through the plate 1a and is held to be vertically movable. The upward movement of the mechanism 28 is stopped when a flange 32a formed on a terminal section 32 having contact terminals 31 abuts against the lower surface of the plate 1a. A spring 33 is provided about the shaft 29, so that the lever 27 is always biased counterclockwise.

The holder 15 has a recess corresponding to the shape of the card 14 and a depth of about 0.8 mm corresponding to the thickness of the card 14. A window 15a is formed in the holder 15 to bring the connector 14a facing the terminal section 32 when the card 14 is placed on the holder 15. The terminals 31 are located within the window 15a. When the roller 18 is located in the rest position of FIG. 3A, the section 32 is moved downward to the OFF position by the biasing force of the spring 33. The biasing force of the spring 33 is smaller than an elastic force of the spring 24. When the carriage 17 is moved toward the holder 15, as shown in FIG. 3B, the shaft 29 and the section 32 are moved upward by the elastic force of the spring 24 through the transmission wire 25 and the lever 27 and the section 32 are brought into the ON position so that the contact terminals 31 are in contact with the connector 14a. Lead wires 34 are led from the terminals 31 through the section 32 and the shaft 29 and are connected to an electronic circuit 35 mounted on the lower surface of the plate 1a.

The circuit 35 comprises an IC circuit (to be described in detail later). A ring holding mechanism 36 is arranged in the body 1 to hold the units 16a, 16b and 16c. The mechanism 36 comprises a motor herein and drives wheels of the units 16a, 16b and 16c in response to an instruction from the circuit 35, thus constituting a card terminal 40.

Figure 4:
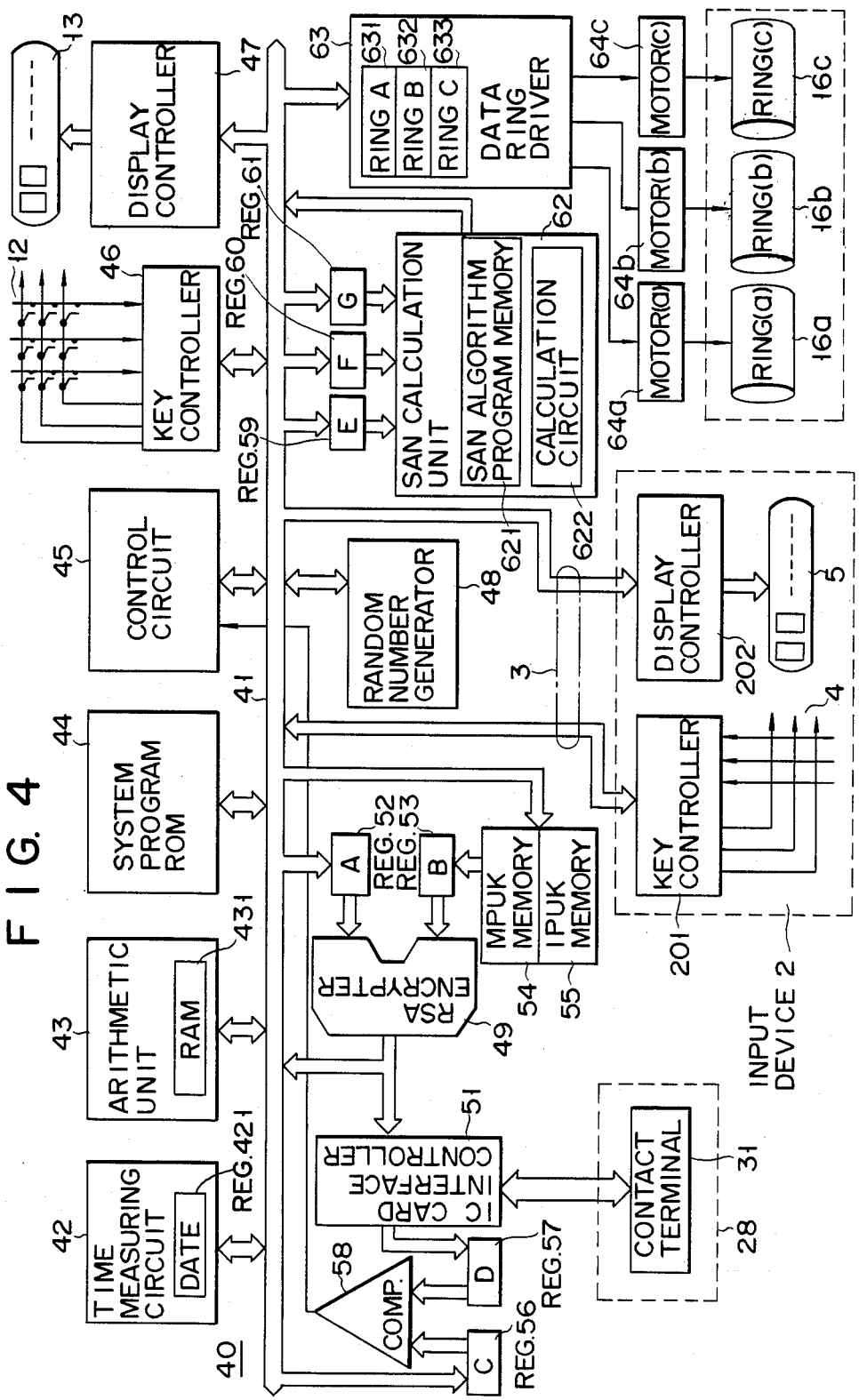
FIG. 4 is a block diagram showing an electrical circuit of the card terminal of FIG. 1.

The detailed arrangement of the electronic circuit 35 will be described in detail with reference to FIG. 4. Referring to FIG. 4, reference numeral 41 denotes a bus. The bus 41 is connected to a time measuring circuit 42, an arithmetic unit 43, a system program ROM 44, a control circuit 45, a key controller 46 for controlling the keyboard 12, a display controller 47 for controlling the display unit 13, and a random number generator 48. The circuit 42 has a date register 421 for storing 8-digit date data representing year (AD), month and day. The unit 43 has a RAM 431 for storing arithmetic operation data. The bus 41 is also connected to an RSA encrypter 49 for storing a predetermined encryption algorithm of an RSA encryption scheme. The bus 41 is further connected to the terminals 31 of the mechanism 28 through an IC card interface controller 51. One input terminal of the encrypter 49 is connected to the bus 41 through an A register 52, and the other input terminal thereof is connected to an MPUK (Manufacturer Public Key Code) memory 54 for storing an MPUK or an IPUK (Issuer Public Key Code) memory 55 for storing an IPUK. The MPUK code is preset by the manufacturer (i.e., a manufacturing company of the card terminal 40), and the IPUK code is preset by the manufacturer in accordance with a request of an issuer (e.g., a credit card company issuing the IC card). One of the memories 54 and 55 is accessed in response to a control signal sent through the bus 41, and the accessed code is stored in a B register 53. The encrypter 49 encrypts the data in the register 52 in accordance with a key code stored in the register 53. An encrypted code is supplied to the bus 41 and the IC card interface controller 51. The bus 41 and the controller 51 are connected to a comparator 58 through a C register 56 and a D register 57, respectively. The comparator 58 compares the data stored in the register 56 with that in the register 57. A comparison result is supplied to the circuit 45. The bus 41 is also connected to an SAN (Sales Approval Number) calculation unit 62 through E, F and G registers 59, 60 and 61 and to a data ring driver 63. The unit 62 has an SAN algorithm program memory 621 and a calculation circuit 622. The unit 62 also has arithmetic registers X, Y and Z and auxiliary register A and B. The driver 63 has a ring A register 631, a ring B register 632 and a ring C register 633 and controls motors 64a, 64b and 64c in accordance with the data stored in the registers 631, 632 and 633. Desired numeric values are preset in the units 16a, 16b and 16c. The bus 41 is also connected to the input unit 2 through the cord 3. The unit 2 has a key controller 201 for controlling the keyboard 4 and a display controller 202 for controlling the unit 5.

The detailed arrangement of the IC chip incorporated in the card 14 will be described with reference to FIG. 5. Referring to FIG. 5, reference numeral 14a denotes a connector connected to a bus 72 through an interface 71. The bus 72 is connected to an arithmetic unit 73, an arithmetic RAM 74, a system program ROM 75, an RTR memory 76 for storing retry number data RTR and a CA (Card Authenticator) memory 77 for storing a CA code. The CA code comprises, for example, a 64-bit code assigned to each card so as to identify it. The CA code is preset during manufacture of cards and is used for encrypting and decrypting the message. The bus 72 is also connected to an MPRK (Manufacturer Private Key) memory 78 for storing an MPRK code, an IPRK (Issuer Private Key) memory 79 for storing an IPRK code, a PIN (Personal Identification Number) memory 80 for storing a PIN code, a and b registers 81 and 82, and an RSA decrypter 83 for decrypting the data encrypted by the encrypter 49 in accordance with an RSA decryption scheme. The MPRK code written in the MPRK memory 78 is a decrypting code preset by the manufacturer and has one-to-one correspondence with the MPUK code stored in the memory 54 of FIG. 4. The IPRK code written in the IPRK memory 79 is a decrypting code preset by the issuer and has one-to-one correspondence with the IPUK code stored in the memory 55 of FIG. 4. The PIN code stored in the memory 80 is set by an individual card holder. The PIN code supplied from the card terminal 40 is written in the a register 81 and is supplied together with the contents of the memory 80 to a comparator 84. The comparator 84 receives the data from the memory 80 and the register 81, and a comparison result is supplied to a control circuit 85. The circuit 85 selects one of the memories 78 and 79 in accordance with a coincidence/noncoinidence signal from the comparator 84 and supplies a control signal to the decrypter 83. The code read out from the memory 78 or 79 is supplied to the decrypter 83 through the register 86. The decrypter 83 also receives data from the card terminal 40 through the register 82. The decrypter 83 decrypts the code in accordance with the storage content of a register 86 which is read out from the memory 78 or 79.

Figure 6:
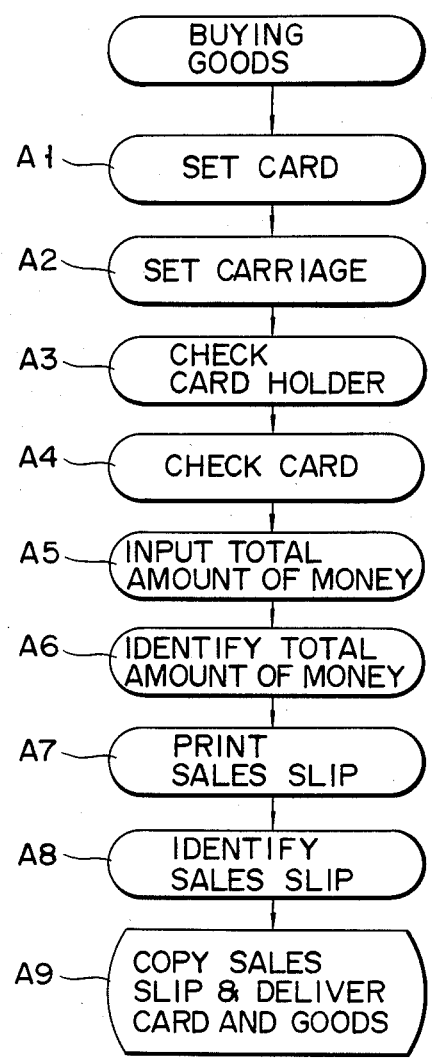
FIG. 6 is a flow chart for explaining the operation for a sale at a store.

Goods sales processing in the embodiment described above will be described with reference to a flow chart of FIG. 6. The terminal 40 shown in FIGS. 1, 3A and 3B is installed in a store or the like. When a customer wishes to purchase an item, in step A1, the store clerk sets the card 14 on the holder 15 so that the embossed portion faces upward and the connector 14a side faces downward in the manner shown in FIG. 3B. The clerk places a sales slip 91 on the emboss imprint unit 11, i.e., on a portion above the card 14 and the units 16a, 16b and 16c, and sets the carriage 17 in the predetermined position in step A2. In other words, the carriage 17 is moved from the normal rest position to the start point of the holder 15, as shown in FIG. 3B. When the carriage 17 is moved to the start position of the holder 15, the lever 22 can be released from the roller 18, so that the left end of the lever 22 is moved upward by the elastic force of the spring 24. Upon movement of the lever 22, the lower end portion of the lever 27 is pulled by the wire 25 to the left. The lever 27 is pivoted clockwise to move the shaft 29 of the mechanism 28 upward. In this state, the terminals 31 are in contact with the connector 14a of the card 14. As a result, the internal circuit of the card 14 is connected to the circuit 35 in the body 1 through the terminals 31 and the wires 34. The clerk then operates the collation key 12d in the keyboard 12. Upon operation of the key 12d, the card holder is checked by the circuit 35 of FIG. 4 in step A3. In this case, the customer enters his own PIN at the unit 2. The circuit 35 supplies the input PIN from the unit 2 to the card 14 through the controller 51. The card 14 checks whether or not the input PIN is correct. More specifically, when the PIN is supplied from the circuit 35, the comparator 84 (FIG. 5) of the card 14 compares the input PIN with the preregistered PIN to check whether or not the input PIN is correct. The card 14 sends back an OK message to the circuit 35 when the input PIN is correct. However, when the input PIN is not correct, the card 14 sends back a BAD message to the circuit 35. When the circuit 35 receives the BAD message from the card 14, the current transaction is interrupted. However, when the circuit 35 receives the OK message, the circuit 35 checks in step A4 of FIG. 6 whether or not the card 14 is valid. If NO in step A4, the transaction is interrupted. However, if YES in step A4, the OK message is displayed on the unit 13. When the OK message is displayed on the unit 13, the clerk enters a total amount of money data at the keyboard 12 in step A5.

Then, the total amount data is stored in the RAM 431 in the unit 43 and is also displayed on the unit 13 through the controller 47. The circuit 35 supplies the total amount data from the RAM 431 to the driver 63 and writes it in the register 631. At the same time, the circuit 35 reads out the date data from the register 421 in the circuit 42 and stores it in the register 632 in the driver 63. The unit 62 calculates a sales approval number (SAN) which is then written in the register 633 in the driver 63. The driver 63 drives the motors 64a, 64b and 64c in accordance with the data stored in the registers 631, 632 and 633, so that the total amount, the date and the sales approval number (SAN) are set in the units 16a, 16b and 16c, respectively. Since the total amount of money is displayed on the unit 13, the customer can check in step A6 whether or not the input total amount is correct. After the total amount is checked by the customer, the clerk moves the carriage 17 in step A7 to imprint data such as an account number PAN (Primary Account Number) preset by the credit card company or the like on the slip 91. At the same time, the total amount, the date and the sales approval number preset in the units 16a, 16b and 16c are imprinted on the slip 91. The contents of the slip 91 are checked by the customer in step A8. If no errors are found, a copy of the slip 91, the card 14 and the purchased item or goods are handed to the customer, thereby completing the transaction.

The operation of the card terminal 40 and the internal operation of the card 14 which are shown in steps after step A3 will be described with reference to the flow charts of FIGS. 7 and 8. In step A2, when the carriage 17 is set at a position as shown in FIG. 3B and the collation key 12d is depressed, the terminal 40 waits in step B1 of FIG. 7 until a PIN is entered at the keyboard 12. When the PIN is entered at the keyboard 12, the input PIN is supplied to the card 14 through the controller 51 in step B2. Thereafter, the terminal 40 waits until the OK or BAD message is sent back from the card 14.

Figure 8:
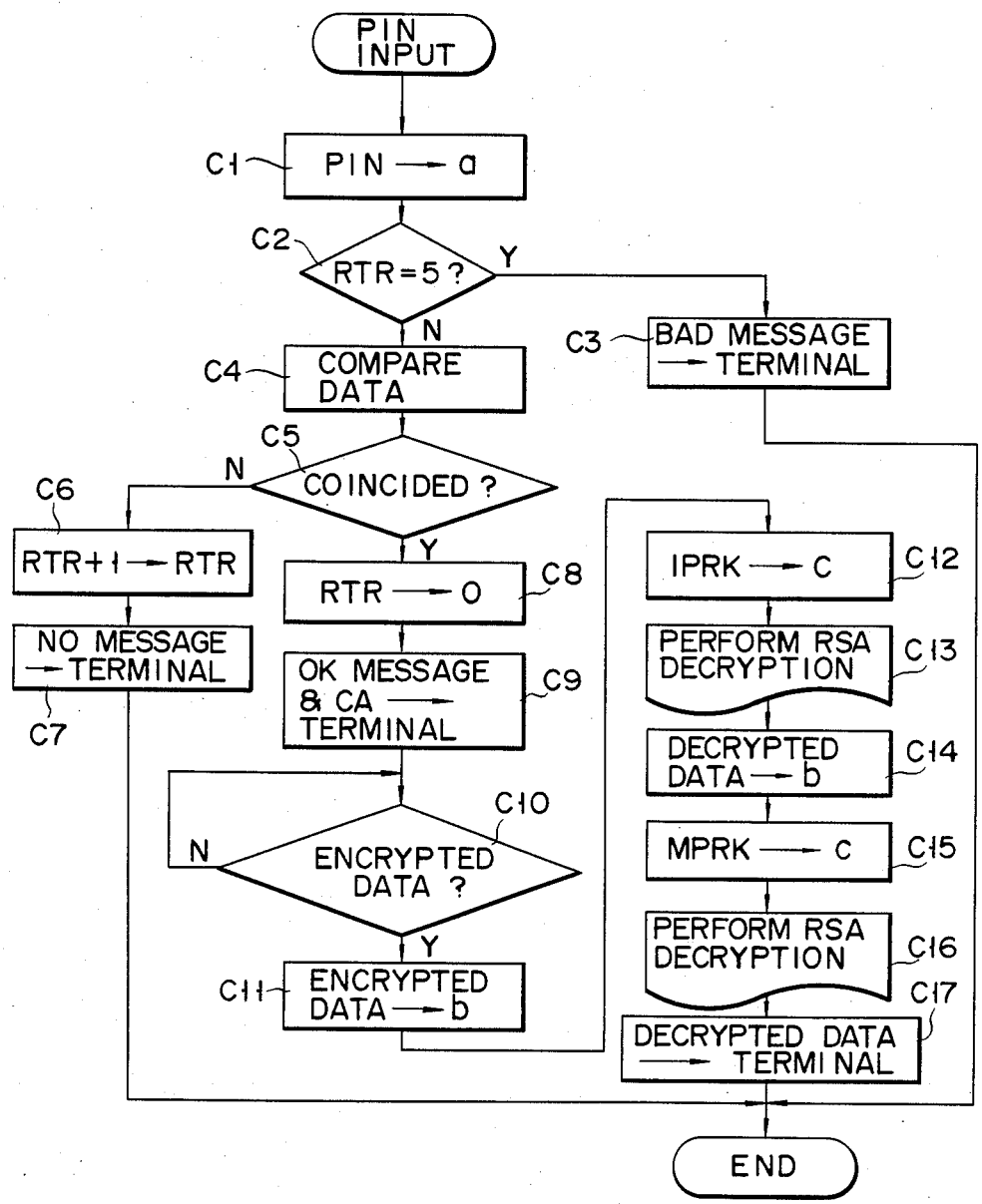
FIG. 8 is a flow chart for explaining the internal operation of the IC card.

When the input PIN is supplied from the terminal 40 to the IC circuit in the card 14 which is illustrated in detail in FIG. 5, the input PIN is set in the register 81 in step C1 of FIG. 8. The card 14 checks in step C2 whether or not the data RTR stored in the memory 76 has reached "5". If YES in step C2, the BAD message is sent back to the terminal 40 in step C3, and processing is ended. The content of the memory 76 is set to be "0" in the initial state. Since NO in step C2, the flow advances to step C4. The comparator 84 compares in step C4 the input PIN supplied from the terminal 40 and the data stored in the register 81 with the preset PIN read out from the memory 80 and checks in step C5 whether or not the input PIN coincides with the preset PIN. If NO in step C5, the flow advances to step C6, and the content of the memory 76 is incremented by one. In step C7, a NO message is sent back to the terminal 40. However, if YES in step C5, the flow advances to step C8, and the contents of the memory 76 are cleared. Thereafter, in step C9, the OK message and the CA code read out from the memory 77 are sent back to the terminal 40. When the card 14 checks the card holder and the message is sent back to the terminal 40, the flow advances to step C10. The card 14 waits until the encrypted data is sent from the terminal 40.

Figure 7:
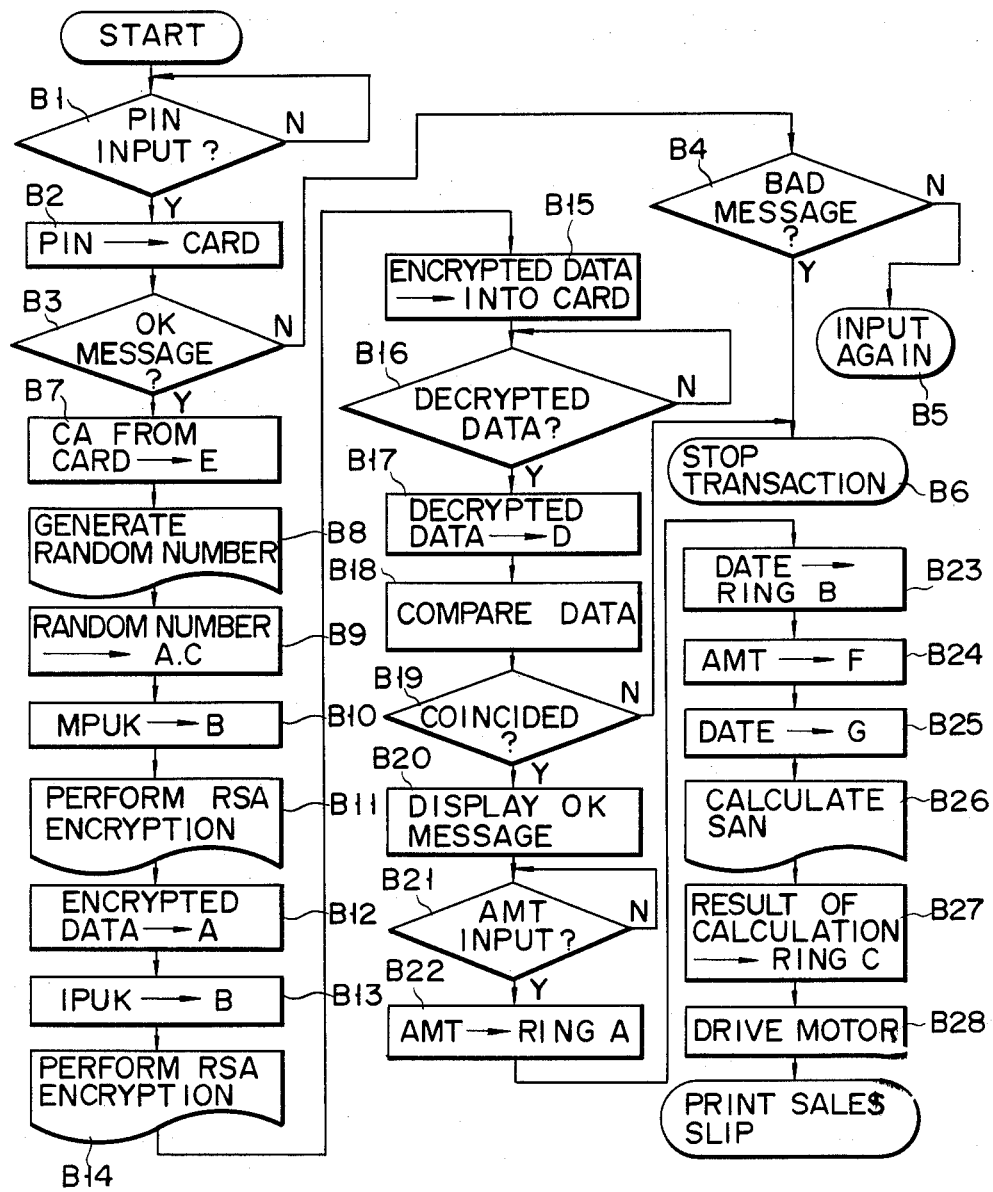
FIG. 7 is a flow chart for explaining the operation of the card terminal when a collation key of the card terminal is depressed.

In step B3 of FIG. 7, the terminal 40 waits until message is sent back from the card 14. When the message is sent back from the card 14, the terminal 40 checks whether or not the message is the OK message. If NO in step B3, the flow advances to step B4. The terminal 40 checks in step B4 whether or not the message is the BAD message. If NO in step B4, the message is determined not to be the BAD message but being no message, so that a message instructing re-entry of the PIN is displayed on the unit 13 in step B5. When no coincidence is established even if the PIN is entered five times, the BAD message is sent back from the card 14 to the terminal 40. The flow advances from step B4 to step B6, and the transaction is interrupted.

If YES in step B3, the flow advances to step B7, and the CA code from the card 14 is set in the E register 59. In step B8, a random number is generated from the random number generator 48. In step B9, the random number is set in the registers 52 and 56. Thereafter, in step B10, the circuit 45 accesses the memory 54 to read out the MPUK code and sets it in the B register 53. In step B11, the random number set in the register 52 is encrypted using the MPUK code. The encrypted data is set in the register 52 in step B12. In step B13, the IPUK code is read out from the memory 55 and is set in the register 53. The data set in the register 53 is encrypted by the RSA encrypter 49 in accordance with the readout IPUK code in step B14. The encrypted data is supplied to the card 14 in step B15. The terminal 40 waits until the data is sent back from the card 14 in step B16.

When the encrypted data is sent from the terminal 40 to the card 14, the card 14 detects the encrypted data in step C10 of FIG. 8. The encrypted data is set in the register 82 in step C11. In step C12, the IPRK code is read out from the memory 79 and is set in the register 86. The encrypted data stored in the register 82 is decrypted by the decrypter 83 in accordance with the readout IPRK code in step C13. In step C14, the decrypted data is written in the register 82. Thereafter, in step C15, the MPRK code is read out from the memory 78 and is stored in the register 86. In step C16, the data stored in the register 82 is decrypted in accordance with the readout MPRK code. The decrypted data is sent back to the card terminal 40 in step C17. Thus, the IC card 14 processing is completed.

Figure 9:
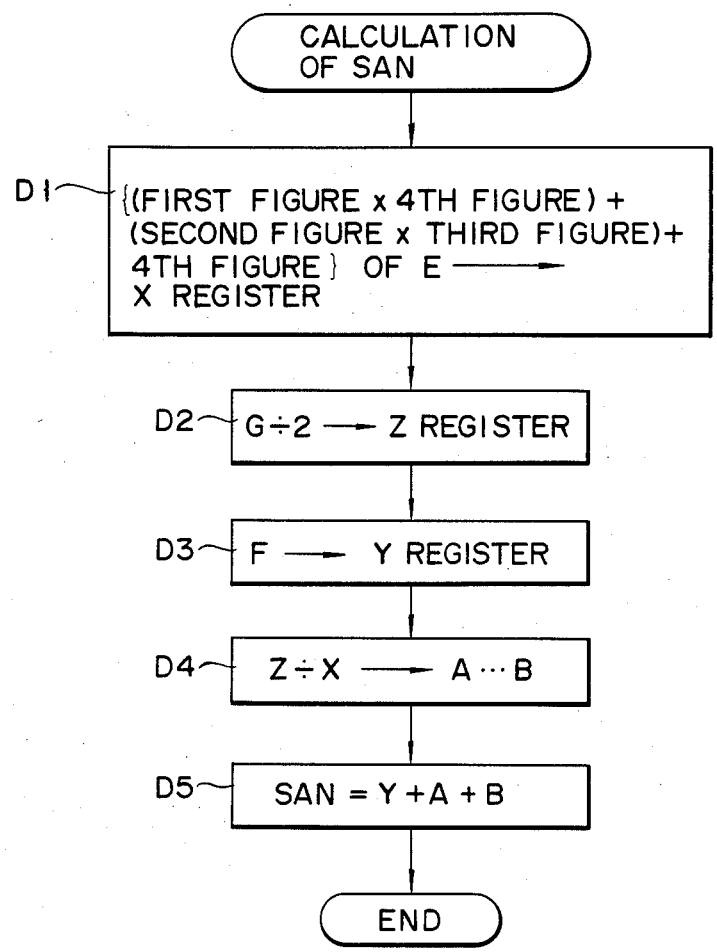
FIG. 9 is a flow chart for explaining a calculation of a sales approval number (SAN)

When the decrypted data is sent from the card 14 to the terminal 40, the terminal 40 detects the decrypted data from the card 14 in step B16 of FIG. 7, and the decrypted data is stored in the register 57 in step C17. The flow then advances to step B18, and the random number set in the register 56 in step B9 is compared with the decrypted data set in the register 57. The terminal 40 checks in step B19 whether or not the random number coincides with the decrypted data described above. If NO in step B19, the data encrypted by the terminal 40 is not properly decrypted by the card 14. This result indicates that the card 14 does not store the proper MPRK or IPRK or does not have the proper decrypter 83. In other words, the terminal 40 determines that the card 14 is illegally manufactured or issued. The transaction is interrupted in step B6. However, if YES in step B19, the terminal 40 determines that the card 14 is legally manufactured and issued. In step B20, the OK message is displayed on the unit 13. Upon checking of the OK message, the clerk enters the total amount of money data at the keyboard 12 and depresses the key 12c. The operation of the key 12c is detected in step B21, and the flow advances to step B22. In step B22, the total amount data is set in the register 631 in the driver 63. In step B23, the date data stored in the register 421 in the circuit 42 is set in the register 632. Subsequently, after the total amount data is transferred to the register 60 in step B24, in step B25, the date data held in the register 421 is transferred to the register 61. In step B26, the unit 62 calculates the sales approval number SAN in accordance with the data stored in the registers 59, 60 and 61. The SAN is calculated by the flow chart of FIG. 9. In step D1 of FIG. 9, the CA code held in the register 59 is subjected to the following calculation:

((first figure)×(fourth figure))+((second figure)×(third figure))+(fourth figure)

The calculation result is stored in the X register in the unit 62. In step D2, the 8-digit date data stored in the register 61 is divided by 2, and the quotient is stored in the Z register. For example, when date data represents Oct. 18, 1984, the value "19841018" is divided by 2, and the quotient "9920509" is stored in the Z register. In step D3, the total amount data AMT stored in the register 60 is transferred to the Y register. Thereafter, the flow advances to step D4. The content of the Z register is divided by the content of the X register, and the quotient and remainder are respectively stored in the A and B registers. In step D5, the contents of the Y, A and B registers are added to obtain the sales approval number SAN. The SAN is supplied to the driver 63 in step B27 of FIG. 7 and is set in the register 633. Thereafter, the flow advances to step B28, and the motors 64a, 64b and 64c are driven in accordance with the data stored in the registers 631, 632 and 633, thereby setting the printing data in the units 16a, 16b and 16c. The printing data setting process for the units 16a, 16b and 16c is completed. Thereafter, the carriage 17 is moved to print the predetermined data on the slip 91.

Figure 10:
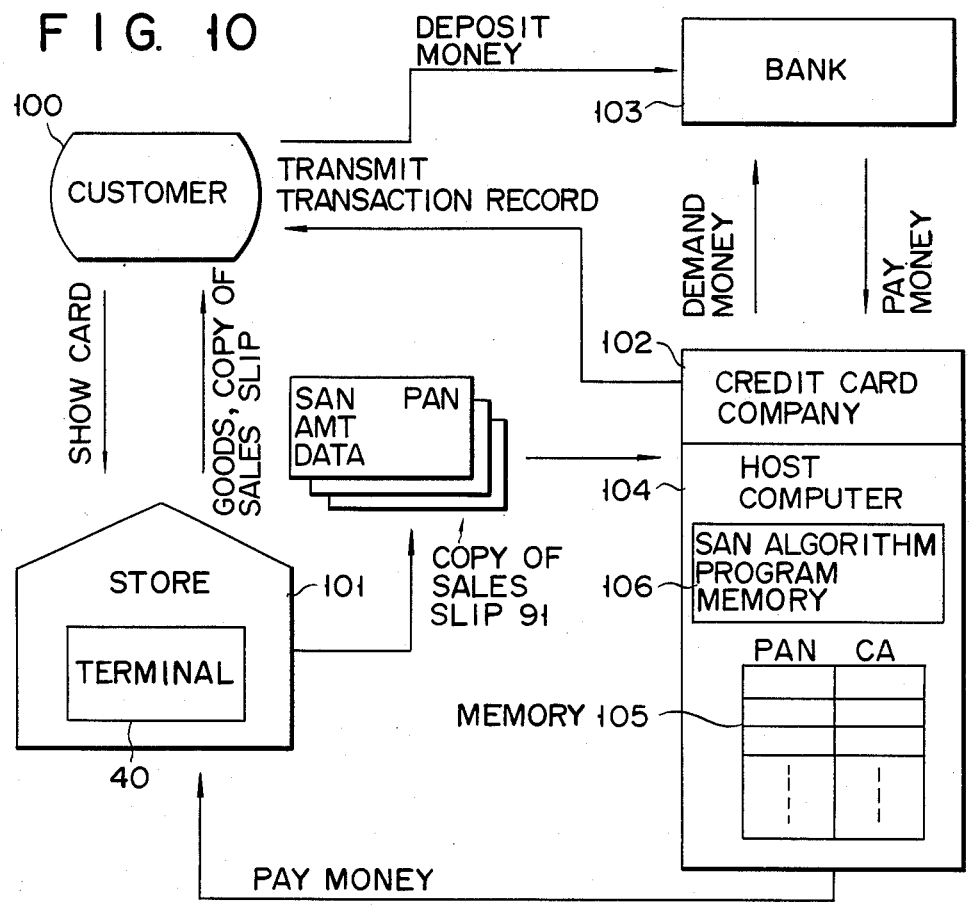
FIG. 10 is a chart showing transaction and account settlement processes between the customer, the store, the credit card company and the bank.
Figure 11:
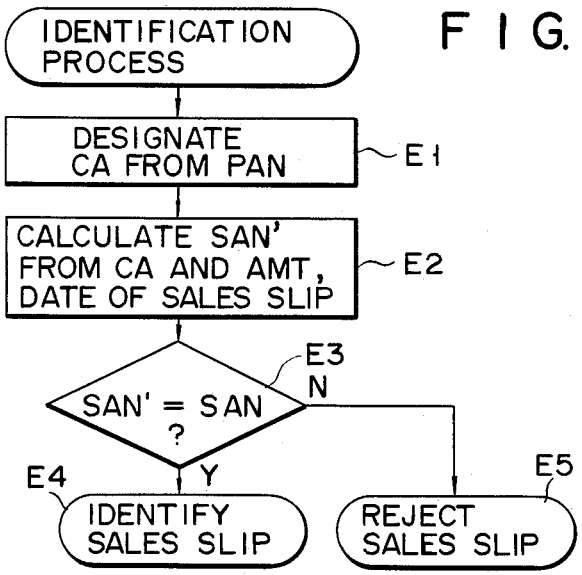
FIG. 11 is a flow chart showing authentication operation of the sales slip of the credit card company.

When sales processing using the card 14 is completed, the slip 91 is issued. The issued slip 91 is then checked for authenticity by the credit card company. FIG. 10 shows the relationship between a customer 100, a store 101, a credit card company 102 and a bank 103, and the checking operation of the slip 91 in the company 102. When the store 101 sells goods to the customer 100 using the card 14, the copy of the slip 91 is handed to the customer 100 together with the purchased goods. The store 101 mails the duplicate of the slip 91 to the company 102. The company 102 has a host computer 104 which stores in a memory 105, the personal account numbers (PANs) each assigned to a specific customer at the time of issuance of the card 14 and the CA code read out from the card 14 at the time of setting the PAN. The pair of PAN and CA codes constitute personal reference data. The computer 104 also stores in a memory 106, an SAN algorithm program which is the same as that stored in the unit 62 in each card terminal. In the company 102, a means for discriminating whether or not the SAN (encrypted data) is calculated in accordance with the predetermined algorithm is arranged in the computer 104, i.e., the host authentication system. The company 102 thus checks whether or not the slip 91 is issued by a legal card terminal 40. When the slip 91 is mailed from the store 101 to the company 102, processing shown in the flow chart of FIG. 11 is performed in accordance with the program in the memory 106 to check authenticity of the slip 91 and hence of the card terminal 40 which issued the mailed slip 91. In step E1 of FIG. 11, a CA code corresponding to the PAN recorded on the slip 91 is read out from the memory 105. In step E2, a sales approval number SAN' is calculated in accordance with the program in the memory 106 using the CA code read out from the memory 105 and the AMT and date data printed on the slip 91. In step E3, the SAN' calculated in step E2 is compared with the SAN printed on the slip 91. If YES in step E3, the SAN algorithm program stored in the unit 62 in the terminal 40 is the same as that stored in the computer 104 in the company 102. This indicates that the terminal 40 is one legally approved by the company 102. The slip 91 is approved in step E4, so that the company 102 settles the account with the store 101. However, if NO in step E3, the company 102 determines that the card terminal 40 is not legal. In step E5, the slip 91 is not approved, and no account settlement is performed. When the company 102 approves the slip 91 and settles the account with the store 101, the corresponding statement (transaction record) is mailed to the customer 100. At the same time, the company 102 requests account settlement with the bank 103 specified by the customer. The bank 103 settles the account with the company 102 at a specific date. Therefore, the sales transaction is completed.

In the above embodiment, the printing portion 16 comprises ring units but may be constituted by a thermal printer or the like.

According to the present invention, there is provided a card terminal and a card terminal identification system, wherein encrypted data is calculated in accordance with a predetermined encrypting algorithm using transaction data such as total amount data and card holder membership number data so as to approve a transaction as legal in accordance with the encrypted data, a means for discriminating that the encrypted data is calculated by the predetermined algorithm is arranged in a host authenticator so as to check whether or not a terminal is legal, thereby properly approving authenticity of the transaction and the card terminal.

What is claimed is:

1. An IC card terminal comprising:
   a top plate;
   an IC card holder arranged on said top plate; connecting means for electrically connecting a connector unit of an IC card received in said IC card holder;
   means for entering personal identification number data into said IC card;
   means for receiving confirmation data from the IC card indicative of a result of authentication of the personal identification number;
   means for inputting, after receipt of said confirmation data indicative of a confirmed authentication, information data relating to a transaction;
   means for processing said information data;
   emboss imprinting means having a carriage provided with a pressure roller mounted to roll along said top plate for transferring an embossed pattern formed on a surface of said IC card onto a transaction sheet;
   housing means for housing therein said IC card holder, connecting means, entering means, receiving means, inputting means, and processing means; and
   actuating means for alternately setting said connecting means into one of a first and second states in accordance with a position of said carriage, said first state being one in which the connecting means is in electrical communication with the connector unit of said IC card, and said second state being one 2. A terminal according to claim 1, wherein said information data processing means comprises: means for reading card authentication data from said IC card; means for storing an encryption algorithm; means for calculating sales approval number data using said card authentication data in accordance with the encryption algorithm; and means for outputting the sales approval number data.

3. A terminal according to claim 2, further comprising: time measuring means for counting at least date data; said calculating means including means for using the date data for a sales approval number data calculation.

4. A terminal according to claim 1, further comprising means for printing on a sales slip various data processed in said terminal.

5. A terminal according to claim 4, wherein the printing data include date data, total amount of money data and sales approval number data.

6. A terminal according to claim 4, wherein said printing means comprises a printing register for temporarily storing data to be printed; a motor; and a printing ring unit driven by said motor.

7. A terminal according to claim 1, wherein said personal identification number inputting means include a keyboard arranged separately from said housing means.

8. A terminal according to claim 1, wherein the position of said connecting means relative to the IC card defines the respective first and second states.

9. An IC card terminal system comprising:
   an IC card incorporating an IC chip therein, said IC chip including memory means for storing card authentication (CA) data and a first personal identification number (PIN) data, and means for comparing second PIN data supplied from a terminal and said first PIN data stored in said memory means;
   said IC card terminal having:
   (a) means for inputting said second PIN data;
   (b) means for storing CA data read out from said IC card when said first and second PIN data coincide with each other;
   (c) means for entering total amount of money data;
   (d) time measuring means;
   (e) means for calculating sales approval number (SAN) data using the CA data, total amount of money data and the date data obtained from the time measuring means;
   (f) means for printing the SAN data on a transaction sheet; and
   a host computer for checking whether the SAN data printed by said IC card terminal is valid.

10. A system according to claim 9, further comprising means for storing a specific algorithm, and said host computer comprises means for discriminating whether or not the SAN data is encrypted in accordance with the specific algorithm.

11. A system according to claim 9, wherein said printing means print at least the SAN data and data used for calculation thereof; and said host computer comprises means, for calculating reference sales approval number (SAN') data and means for comparing the sales approval number (SAN) data with the reference sales approval number data (SAN').

12. A system having an IC card and a terminal, comprising:
   an IC card having means for comparing input personal identification number (PIN) data with preset PIN data; and means for decrypting data encrypted by the terminal; and a terminal having
   (a) means for inputting PIN data of an IC card holder;
   (b) means for generating a random number;

(c) means for encrypting the random number data generated by said random number generating means;
(d) means for supplying encrypted data to an IC card; and
(e) means for comparing said random number data with corresponding decrypted data received from said IC card.

13. A system according to claim 12, wherein the encrypting means of said terminal includes memory means for storing first key code data for encrypting said random number; and said decrypting means of the IC card includes second memory means for storing second key code data which is different from the first key code data but have a correlation with the first key code data in a one to one correspondence in accordance with a predetermined function, said encrypted data being decrypted by the second key code data.

14. A system according to claim 12, wherein the encrypting means of said terminal comprises means for storing two encrypting key code data determined, respectively, by an IC card manufacturer and an IC card issuer, and said decrypting means of the IC card comprises means for storing two decrypting key code data corresponding, respectively, to the two encrypting key code data.

15. A system according to claim 12, wherein said encrypting means in said terminal includes an RSA encrypter.

* * * * *